United States Patent [19]
Anderson

[11] Patent Number: 5,821,726
[45] Date of Patent: Oct. 13, 1998

US005821726A

[54] BALANCED AND SYNCHRONIZED PHASE DETECTOR FOR AN AC INDUCTION MOTOR CONTROLLER

[75] Inventor: Nicholas Anderson, Queen, N.Y.

[73] Assignee: Power Efficiency Corp., Hackensack, N.J.

[21] Appl. No.: 786,787

[22] Filed: Jan. 21, 1997

[51] Int. Cl.⁶ .................................................. H02P 7/628
[52] U.S. Cl. ........................ 318/809; 318/437; 318/811
[58] Field of Search .................................. 318/437, 438, 318/729, 798–801, 805, 807, 809, 810, 811

[56] References Cited

U.S. PATENT DOCUMENTS

| | | |
|---|---|---|
| 3,913,002 | 10/1975 | Steigerwald et al. . |
| 4,052,648 | 10/1977 | Nola . |
| 4,379,258 | 4/1983 | Sugimoto . |
| 4,384,243 | 5/1983 | Muskovac . |
| 4,388,578 | 6/1983 | Green et al. . |
| 4,404,511 | 9/1983 | Nola . |
| 4,459,528 | 7/1984 | Nola . |
| 4,618,805 | 10/1986 | Hornung .............................. 318/432 X |
| 4,939,632 | 7/1990 | Plagge et al. . |
| 5,017,855 | 5/1991 | Byers et al. ............................ 318/811 |
| 5,140,243 | 8/1992 | Lyons et al. ............................ 318/701 |
| 5,241,256 | 8/1993 | Hatanaka et al. . |

FOREIGN PATENT DOCUMENTS

| | | |
|---|---|---|
| 04-351492 | 12/1992 | Japan . |
| 05-227795 | 9/1993 | Japan . |
| 8002895 | 12/1980 | WIPO . |

*Primary Examiner*—Bentsu Ro

[57] ABSTRACT

A balanced and synchronized phased detector circuit is provided for a three phase power controller for AC induction motors. The power controller includes a thyristor or switching element for each motor phase winding between a line phase terminal of a three power line and the motor's input terminals, and decides the sequence for firing the thyristors. The phase detector includes a dividing resistor network between each phase's line terminal and the front-end operational amplifiers used in the phase detector, and an adjustable dividing resistor network between each motor terminal and the front-end operational amplifiers. The resistor networks allow a differential voltage to be set between the phase line terminal and the motor terminal for each phase, to a voltage appropriate for firing the respective thyristor. By allowing control over the front-end differential voltage, the phase detector virtually elements vibrations encountered during operation of the motor.

7 Claims, 2 Drawing Sheets

5,821,726

BALANCED AND SYNCHRONIZED PHASE DETECTOR FOR AN AC INDUCTION MOTOR CONTROLLER

The present invention relates to power input controllers for induction motors, and in particular to an improved phase detector for use in a power input controller. The present invention finds applicability for use with energy efficient three phase motors.

BACKGROUND OF THE INVENTION

Motor controllers for AC induction motors are generally known in the art, a very popular one being disclosed by Frank Nola in his U.S. Pat. No. 4,459,528, issued Jul. 10, 1984. For each phase of a three phase AC induction motor, Nola connects a silicon controlled rectifier between the phase's power input line and the motor's corresponding input terminal. The power input lines are from a typical three-power line. To control each silicon controlled rectifier, Nola arranges a phase detector which, together with an associated ramp generator, is further connected to a signal conditioning circuit, a comparator, and finally to a gate which generates on/off control signals for the silicon controlled rectifier's control gate. Although Nola's controller has been found useful in controlling AC induction motors, it is not without flaw. It is sometimes susceptible to causing vibrations in the motor, especially when used with high efficiency motors.

High efficiency motors are the current trend in motor designs. The "Energy Policy Act of 1992," for example, now mandates that all general purpose AC polyphase Nema "T" Frame motors manufactured after October 1997 must meet new specific efficiency requirements. This Act may be the harbinger of continued evolution toward more efficient motor designs, an evolution which will greatly impact the electrical characteristics of motors, including inductance, reactance, resistance, and impedance as compared to previous motor designs.

High efficiency motors connected to a motor controller such as Nola's often enter undesirable vibrating tantrums, for reasons which were heretofore unknown. Although these vibrations occur more frequently when the controller is used to control high efficiency motors, it is also possible for the vibrations to arise when the controller is used to control other, older types of motors.

In U.S. Pat. No. 4,459,528, fixed resistors were used in a voltage dividing resistor network to scale the voltages from the phase and motor line terminals into voltages appropriate for input to the operational amplifiers A1, A3, A4 as shown in FIG. 1 of the patent. In order to ensure that the input to the positive terminal of operational amplifier A1 exceeded the voltage of the input to the negative terminal, the fixed resistor network was supplemented with a positive feedback resistor between the output of the operational amplifier A1 and its positive input terminal.

SUMMARY OF THE INVENTION

The Inventor has discovered the source of the undesirable vibrations caused by Nola's motor controller.

Nola's U.S. Pat. No. 4,459,528 describes a high common-mode voltage signal rejection between the signals received from the power input phase line and the motor phase line. Nola's controller includes fixed resistors which divide the voltages received from the power input phase line terminal and motor phase line terminal into voltages suitable for input to the front-end operational amplifiers A1, A3, and A4.

When the motor input signal input to the operational amplifier U1 exceeds the line input signal from the phase line terminal, the output of the phase detector becomes momentarily negative causing the pulse width to change abruptly. This is the first stage of motor vibration. The switching within the operational amplifier, created by the motor input signal exceeding the line input signal to the detector in one or more of the phases causes a "hunting" within the controller's signal condition system which, in turn, causes a continuing vibration at the motor. This vibration is due to the phase detector's output switching from a positive to a negative signal.

Motor designers, including Nola, assumed that the differential voltage across the front-end operational amplifier labeled A1 in Nola's FIG. 1 would always be higher on the power input phase line side (i.e., at the operational amplifier's positive input terminal) than on the motor phase line side (i.e., at the operational amplifier's negative input terminal). The voltage differential was assumed to be this way because of the fixed resistor dividers between the input terminals and the operational amplifier, and because of the feedback path from the operational amplifier's output terminal to its positive input terminal.

The Inventor of the present invention, however, has discovered that the fixed resistor voltage divider and feedback resistor used in the prior art does not, in fact, maintain the voltage of the positive input terminal higher than the voltage at the negative input terminal, as previously thought. The fixed resistor voltage divider and feedback resistor fail to account for differences in the incoming power as well as differences in motor construction. The Inventor has discovered that, especially when used with the new generation high efficiency motors, the voltage at the negative input terminal of operational amplifier A1 may exceed the voltage at the positive input terminal. The reason for this is unclear, but may be due to anomalies caused by the use of more non-ferromagnetic materials, such as plastics, in the new high efficiency motors. These materials do not absorb electric and magnetic fields which are created during operation of the motors. Regardless of the cause, however, the result may be a wild vibration of the motor being controlled.

Accordingly, a primary object of the present invention is to provide a method of controlling a motor to substantially reduce the possibility of vibration.

It is a further object of the present invention to provide an improved phase detector which can be adjusted to accommodate any type of multi-phase induction motor, including new high efficiency motors and motors of old design.

It is a further object of the present invention to provide a motor controller including a phase detector having an adjustable voltage divider for setting the input voltages to several operational amplifiers.

These and other objects are fulfilled by providing a method for reducing the likelihood of motor vibration caused by erroneous switching signals from a motor controller, the switching signals controlling on/off operation of firing devices connected between power line inputs and motor line terminals of a multi-phase motor, the controller including a plurality of phase comparators, each phase comparator producing a signal indicating a phase differential between a current phase and voltage phase of received power line and motor line signals, the method comprising the steps of (a) receiving a first power line input voltage to be adjusted for input to a positive input terminal of a first operational amplifier of a first phase comparator, and adjusting the first power line input voltage to a predetermined voltage; (b) receiving a second power line input voltage to be adjusted for input to a positive input terminal of a second operational amplifier of a second phase comparator, and adjusting the second power line input voltage to the predetermined voltage; (c) receiving a first motor line voltage to be adjusted for input to a negative input terminal of the first operational amplifier and, after steps (a) and (b), adjusting the first motor line voltage to be a predetermined amount lower than the predetermined voltage; and (d) receiving a second motor line voltage to be adjusted for input to a negative input terminal of the second operational amplifier and, after steps (a) and (b), adjusting the second motor line voltage to be the predetermined amount lower than the predetermined voltage.

The objects of the present invention are also fulfilled by providing a phase comparator for use in a motor controller, the phase comparator producing a signal indicating a phase differential between a current phase and voltage phase of received power line and motor line signals, the motor controller controlling the supply of power from the power line signals to the motor line signals based upon the phase differential signal, the phase comparator comprising a first operational amplifier having a positive input terminal and a negative input terminal; a first adjustable voltage dividing network for receiving a power line input signal and for outputting a first adjustable voltage signal, the first adjustable voltage signal being connected to the positive input terminal; and a second adjustable voltage dividing network for receiving a motor line input and for outputting a second adjustable voltage signal, the second adjustable voltage signal being connected to the negative input terminal.

The objects of the present invention are also fulfilled by providing a controller for controlling the on/off operation of firing devices connected between power input line terminals and motor input terminals of a multi-phase motor, the controller comprising a plurality of phase detectors, each of the phase detectors connected between a power line input terminal and a motor input terminal and having an output; ramp generator circuitry for producing a plurality of ramp signals; a signal conditioner for summing the outputs from the plurality of phase detectors relative to a negatively biased command signal, and outputting an error signal; and firing device control circuitry for producing firing device control signals which control the on/off operation of the firing devices, the firing device control signals being based upon the error signal and the ramp signals, wherein each of the phase detectors includes a front-end operational amplifier having a positive input terminal and a negative input terminal, a first adjustable voltage dividing network connected between the power line input terminal and the positive input terminal, a second adjustable voltage dividing network connected between the motor input terminal and the negative input terminal, the first and second adjustable voltage dividing networks being operable for setting a predetermined voltage differential between said positive and negative input terminals to prevent erroneous production of said firing device control signals.

Further scope of applicability of the present invention will become apparent from the detailed description given below. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus should not be considered as limiting the present invention, and wherein.

DESCRIPTION OF THE PREFERRED EMBODIMENTS

Figure 1:
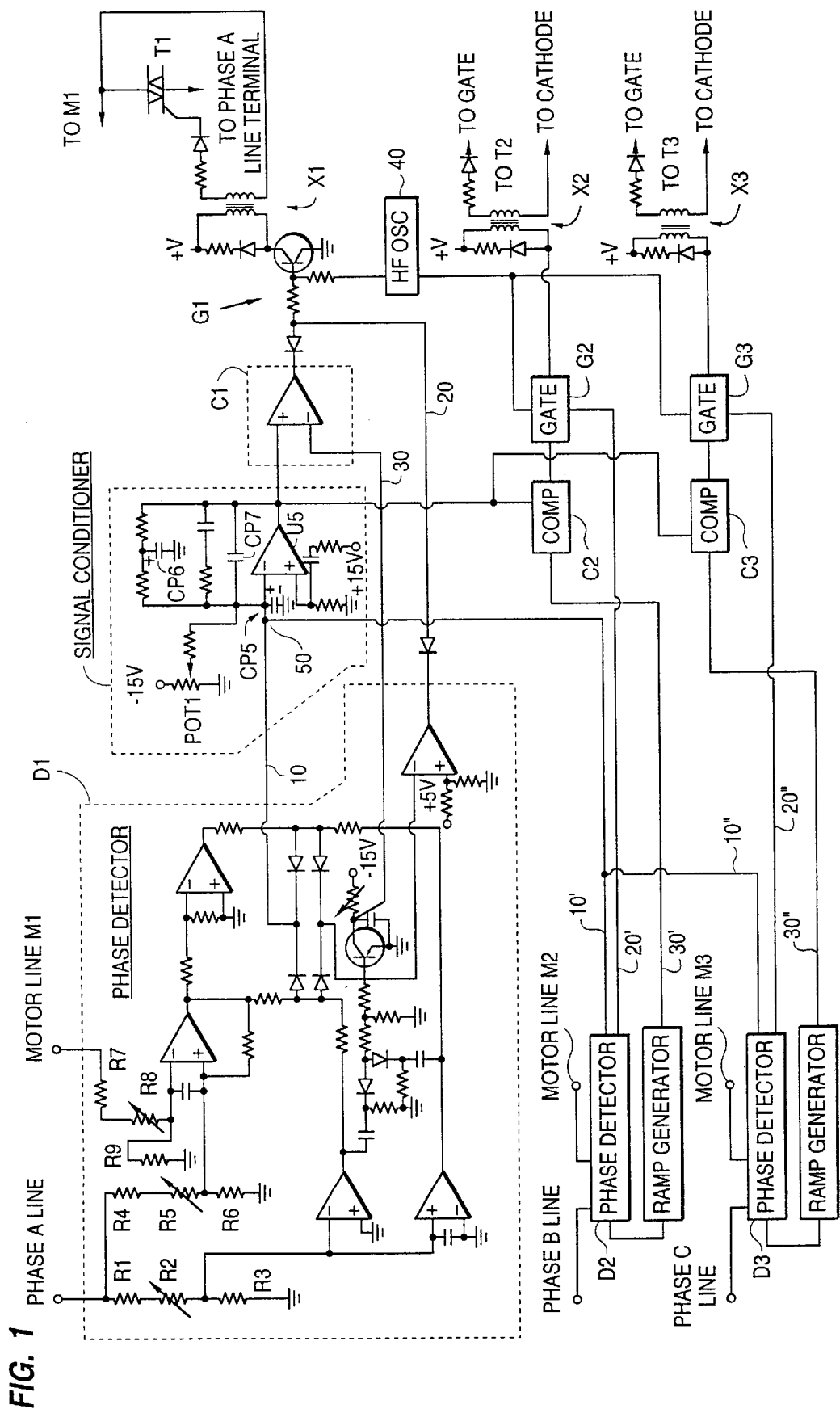
FIG. 1 is a schematic circuit diagram of a three phase energy saving motor controller according to a preferred embodiment of the present invention.

Referring to FIG. 1 there is illustrated a motor control circuit for controlling a three phase motor. It should be understood throughout this specification, however, that the present invention may be adapted to motors controlled by other than three phases. In FIG. 1, a three phase power line (not shown) will have its lines respectively connected to the phase line terminals A, B, C of the motor controller. The three respective input lines of the motor will be connected to the controller's motor line terminals M1, M2, M3. FIG. 1 shows the detailed circuitry for only one of phases because it is preferable to have identical circuitry within each of the three phases. The Signal Conditioner is preferably common to all three phases.

Figure 2:
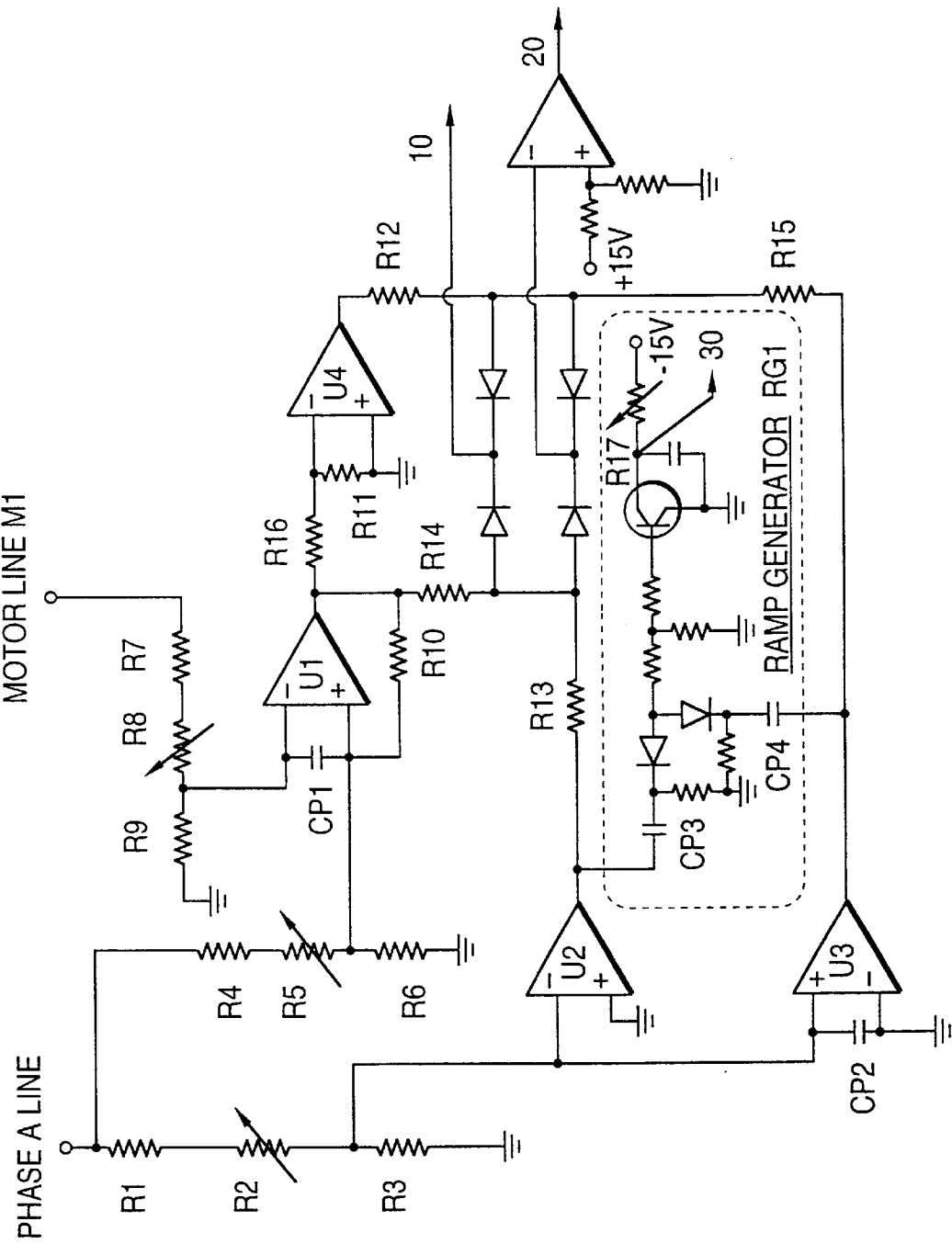
FIG. 2 is a schematic circuit diagram of a phase detector according to a preferred embodiment of the present invention.

For each phase, the phase line terminal and motor line terminal will connect to a phase detector and to a ramp generator which, as shown in FIG. 2, is connected to its corresponding phase detector. Each of the ramp generators is set to a fixed output by the use of a collector-connected variable resistor, such as R17 shown in FIG. 2. The ramp generators are set so that their output amplitudes are identical, and their frequencies are synchronized.

Together, the phase detector and ramp generator provide three output lines 10, 20, 30. Each of the first output lines 10, 10', 10" connect to a single node 50 of the Signal Conditioner so that the Signal Conditioner manipulates the sum of the three signals 10, 10', 10". The output of the Signal Conditioner, and the output 30 of the first ramp generator RG1 connect to a comparator C1. The same type of connection is made for the ramp generator outputs 30' and 30" in the other phases, to respective comparators C2 and C3. The output of the comparator C1 and the output signal 20 from the phase detector D1 connect to a gate G1. The same type of connection is made for the phase detector output 20' and 20" in the other phases, to respective gates G2 and G3. The gates G1, G2, and G3 also receive inputs from a high frequency oscillator 40. The output of each gate connects to a positive voltage source +V through a series-connected diode and resistor. A parallel branch to the positive voltage source also connects the output of the gates to a respective transformer X1, X2, or X3. The series-connected diodes and resistors provide shunts across the respective transformer primaries to suppress inductive voltages. The secondary coils of the transformers X1, X2, and X3 respectively connect to the corresponding thyristor or triac connected between the phase line terminal and the motor line terminal. It should be understood that, although thyristors or triacs T1, T2, and T3 are shown in FIG. 1, any appropriate firing device such as any silicon controlled rectifier may be used.

The phase line terminals A, B, and C typically provide 220 or 440 volts, peak to peak, at 60 cycle AC. However, as indicated earlier, the present invention finds applicability to any size motor as long as the voltages from the power and motor lines are scaled appropriately for use within the controller circuit.

In operation, a three-phase system will provide line voltages and currents which are identical but shifted 120° with respect to one another. The signals 10, 10', 10" are indicative of the phase difference between the current phase of the signal received on the motor terminal and the voltage phase of the signal received on the phase line terminal. These signals, which are essentially pulses, arrive at node 50 in an iterative sequence. The operational amplifier U5 and feedback circuitry of the Signal Conditioner sums the signals 10, 10', 10" relative to a negative offset or command signal obtained from a variable command potentiometer POT1 to produce a steady output voltage representative of an error voltage. The command potentiometer POT1 is shown connected to a −15V source, but the voltage of the source, as with other sources marked +/−15V, may be changed to suit the particular motor being controlled. The negatively biased command signal from the command potentiometer POT1 provides a difference or substraction signal with respect to the positive signals obtained from the outputs 10, 10', 10" from the phase detectors D1, D2, D3.

The error voltage at the output of operational amplifier U5 is compared to the outputs 30, 30', 30" of the ramp generators in the comparators C1, C2, and C3. The ramp generators should be full wave ramp generators. Each ramp generator produces its ramp signal (1) in synchronization with the respective 60 hertz phase line terminal signal, and (2) at an amplitude equal to the amplitude of the other ramp signals as set by the adjustable ramp potentiometer such as R17. The ramp signals thus cause the comparators C1, C2, C3 to switch their respective outputs in the aforementioned iterative sequence. That is, the comparators C1, C2, C3 switch their output signals "low" in sequence so that the firing devices T1, T2, T3 likewise fire in sequence. Detailed operation of the Signal Conditioner, the comparators C1, C2, C3, the gates G1, G2, G3, and the firing devices T1, T2, T3, is described in U.S. Pat. No. 4,459,528, which is incorporated herein by reference. Therefore, further discussion of their operation is not included herein.

According to the present invention, the phase detectors D1, D2, and D3 are each provided with an adjustable voltage dividing resistor network between the phase and motor line terminals, and the front-end operational amplifier U1, U2, and U3.

As seen in FIG. 2, the adjustable dividing resistor networks are used to set the differential voltage between the input terminals of the operational amplifier U1 to a value appropriate for firing the firing device. The differential voltage across the positive and negative input terminals of operational amplifier U1 is preferably set to be 0.05 volts, which is a rather small value considering the voltages of the phase line and motor line terminals may be on the order of 220 or 460 volts, peak to peak.

The first adjustable dividing resistor network includes resistors R4, R5 and R6. In a preferred embodiment, resistor R5 is a variable resistor. The resistors R4, R5, R6 are connected in series between the phase line terminal and ground. A node between resistor R6 and adjustable resistor R5 is tapped for input to the positive terminal of operational amplifier U1.

The negative input to operational amplifier U1 is obtained from a second adjustable resistor network including resistors R7, R8, and R9. The resistors R7, R8, R9 are connected in series between the motor line terminal and ground. A node between resistor R9 and adjustable resistor R8 is tapped for input to the negative input terminal of operational amplifier U1.

A third, independent adjustable network includes resistors R1, R2, and R3 for adjusting input voltages to amplifiers U2 and U3. The operational amplifier U2 is essentially a square wave generator driven by the current from the phase line terminal. The operational amplifier U3 is essentially a voltage induced square wave generator. Resistors R1, R2, R3 are connected in series between the phase line terminal and ground, and in parallel with the other independent adjustable resistor network of resistors R4, R5, R6. Preferably, resistor R2 is an adjustable resistor. A node between resistor R3 and adjustable resistor R2 is tapped for input to the negative input terminal of operational amplifier U2, and to the positive input terminal of operational amplifier U3. The other input terminals of operational amplifiers U2 and U3 are grounded. A capacitor CP2 is preferably connected between the input terminals of operational amplifier U3.

The ramp generator RG1 is connected between the outputs of operational amplifiers U2 and U3. The ramp generator can be any standard ramp generator, and should be a full wave ramp generator. By connecting the ramp generator at the output terminals of operational amplifiers U2 and U3, less load is placed on the incoming phase line, thus helping to ensure a steady voltage at the inputs of operational amplifiers U1, U2 and U3.

In an exemplary embodiment, for a three phase power line supplying 460 volts peak to peak, resistors R1, R4, and R7 may be 390K ohms. Variable resistors R2, R5, R8 may be 50K ohms, and resistor R3, R6, R9 may be 7.5K ohms. The feedback resistor R10 connecting the output of operational amplifier U1 and its positive input terminal, and the resistor R11 connecting the negative and positive input terminals of operational amplifier U4 may each be 220K ohms. The output resistors R12, R13, R14, R15 may each be 22K ohms. The output resistor R16 for operational amplifier U1 may be 20K ohms. A capacitor CP1 connecting the positive and negative input terminals of operational amplifier U1 may be 0.005 $\mu$F, and the capacitor CP2 between the positive and negative input terminals of operational amplifier U3 may be 0.02 $\mu$F. The capacitors CP3 and CP4 linking the ramp generator to the output terminals of operational amplifiers U2 and U3, respectively, may each be 0.1 $\mu$F. The variable resistor R17 used in the ramp generator may be 200K ohms. Referring to FIG. 1, the preferred value for capacitor CP5 linking the negative input terminal of operational amplifier U5 with ground, is 8 pF. The capacitor CP7 connecting the output of the operational amplifier U5 with its negative input terminal is preferably 0.09 $\mu$F, and the capacitor CP6 linking a feedback branch to ground is preferably 0.47 $\mu$F. The capacitors, especially CP5 and CP6, are preferably fast polarized capacitors. It should be understood that these values are merely illustrative a preferred embodiment of the invention. The value of any particular circuit element may be changed as appropriate for any given circumstance. For example, if the phase line signal were a different voltage, such as 220 volts, then the resistance values for resistors R1–R9 should be scaled accordingly.

In order adjust the inventive circuitry for optimal operation, the phase line voltage inputs to the operational amplifiers U1, U2, U3 are set by the variable dividing resistor networks R4–R6 and R1–R3 to exactly the same input levels. The exact same phase line input levels should be set for the same three operational amplifiers in all phase detectors D1, D2, D3. After these levels have been set, the motor line input to operational amplifier U1 is set to a level slightly lower than the line voltage level previously set for the operational amplifiers U1, U2, U3. Preferably, the motor line input at the negative input terminal of the operational amplifier U1 is set lower than the positive terminal by the minimum voltage necessary to fire the firing devices. In a preferred embodiment, the motor line voltage at the negative input terminal is set 0.05 volts AC lower. The same motor line input setting is made for the corresponding operational amplifier U1 in every phase detector D1, D2, D3. After the adjustment operation is completed, the controller is ready to control the motor.

All of the above-mentioned settings are made with the command potentiometer POT1 set (toward the negative voltage source) for the highest motor output signal possible, which in all likelihood will be full motor voltage, in order to ensure that under any and all conditions, the motor line voltage signal at the negative input of operational amplifier U1 will never exceed the line voltage signal at the positive terminal. This, in turn, ensures that the phase detectors will always produce outputs which are positive, since they are compared to the negatively biased command signal obtained through the command potentiometer POT1 of the Signal Conditioner, namely the same negative command signal that was used during the adjustment operation. The difference between the phase detectors' outputs and the negatively biased command signal determines the width of the firing pulse which controls the on/off time of the firing devices.

The above described adjustment operation is best performed with the controller connected to the motor which it will control. It is also possible the perform the adjustments by connected a signal generator to the appropriated terminals, but signals from a signal generator seldom replicate the signals which would actually be encountered with the motor.

It is also preferable to have the command potentiometer POT1 accessible by the end user. This would permit the controller to be adjusted for use with one motor, for example a 100 horsepower motor, and later to be adjusted for use with a different motor, such as a 1 horsepower motor. It would also permit the controller to be adjusted to prevent stalling of "light-duty" motors, or other motors whose breakdown (or maximum) torque is lower than expected.

With the present invention, the output signals 10, 10', 10" from the three phase detectors are balanced and synchronized with each other and with each ramp generator output; the signals are each conditioned by the same signal conditioner; they are combined with the same command signal; they are combined with one high-frequency oscillator signal, and therefore create three separate gate or firing signals identical in all respects. The gate signals are balanced and synchronized so that each thyristor or other firing device is controlled exactly in balance, the end result being a motor which is controlled simultaneously in each phase with the variables that might create instability being eliminated. Significant testing by the inventor has shown increased energy savings, improved stability, and improved response not only for the new generation high efficiency motors, but in all types of three phase motors tested.

Although the preferred embodiment has been described in relation to a motor controller, those of ordinary skill would readily understand the present invention's applicability to other environments in which firing devices must be controlled accurately. The inventive phase detector will also find applicability with still other types of synchronized controllers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for reducing the likelihood of motor vibration caused by erroneous switching signals from a motor controller, the switching signals controlling on/off operation of firing devices connected between power line inputs and motor line terminals of a multi-phase motor, the controller including a plurality of phase comparators, each phase comparator producing a signal indicating a phase differential between a current phase and voltage phase of received power line and motor line signals, said method comprising the steps of:

(a) receiving a first power line input voltage to be adjusted for input to a positive input terminal of a first operational amplifier of a first phase comparator, and adjusting the first power line input voltage to a predetermined voltage;

(b) receiving a second power line input voltage to be adjusted for input to a positive input terminal of a second operational amplifier of a second phase comparator, and adjusting the second power line input voltage to the predetermined voltage;

(c) receiving a first motor line voltage to be adjusted for input to a negative input terminal of the first operational amplifier and, after said steps (a) and (b), adjusting the first motor line voltage to be a predetermined amount lower than the predetermined voltage; and (d) receiving a second motor line voltage to be adjusted for input to a negative input terminal of the second operational amplifier and, after said steps (a) and (b), adjusting the second motor line voltage to be the predetermined amount lower than the predetermined voltage.

2. The method of claim 1, further comprising the steps of:

(e) adjusting, independently of step (a) and prior to said steps (c) and (d), the first power line input voltage to the predetermined level for input to a negative input terminal of a third operational amplifier and to a positive input terminal of a fourth operational amplifier, the third and fourth operational amplifiers being in the first phase comparator; and (f) adjusting, independently of step (b) and prior to said steps (c) and (d), the second power line input voltage to the predetermined level for input to a negative input terminal of a fifth operational amplifier and to a positive input terminal of a sixth operational amplifier, the fifth and sixth operational amplifiers being in the second phase comparator, wherein the third, fourth, fifth, and sixth operational amplifiers are used to produce square-wave output signals for use by the phase comparator.

3. A phase comparator for use in a motor controller, said phase comparator producing a signal indicating a phase differential between a current phase and voltage phase of received power line and motor line signals, the motor controller controlling the supply of power from the power line signals to the motor line signals based upon the phase differential signal, said phase comparator comprising:

a first operational amplifier having a positive input terminal and a negative input terminal;

a first adjustable voltage dividing network for receiving a power line input signal and for outputting a first adjustable voltage signal, the first adjustable voltage signal being connected to said positive input terminal;

a second adjustable voltage dividing network for receiving a motor line input and for outputting a second adjustable voltage signal, the second adjustable voltage signal being connected to said negative input terminal, a second operational amplifier having a negative input terminal and a grounded positive input terminal, said second operational amplifier for outputting a first square-wave signal;

a third operational amplifier having a positive input terminal and a grounded negative input terminal, said third operational amplifier for outputting a second square-wave output signal; and a third adjustable voltage dividing network for receiving the power line input signal and for outputting a third adjustable voltage signal, the third adjustable voltage signal being connected to the negative input terminal of said second operational amplifier, and to the positive input terminal of said third operational amplifier.

4. The phase comparator of claim 3, further comprising:

a ramp generator connected between the outputs of said second and third operational amplifiers.

5. A controller for controlling the on/off operation of firing devices connected between power input line terminals and motor input terminals of a multi-phase motor, said controller comprising:

a plurality of phase detectors, each of said phase detectors connected between a power line input terminal and a motor input terminal and having an output;

ramp generator circuitry for producing a plurality of ramp signals;

a signal conditioner for summing said outputs from said plurality of phase detectors relative to a negatively biased command signal, and outputting an error signal; and firing device control circuitry for producing firing device control signals which control the on/off operation of the firing devices, the firing device control signals being based upon said error signal and said ramp signals, wherein each of said phase detectors includes:

a front-end operational amplifier having a positive input terminal and a negative input terminal, a first adjustable voltage dividing network connected between the power line input terminal and said positive input terminal, a second adjustable voltage dividing network connected between the motor input terminal and said negative input terminal, said first and second adjustable voltage dividing networks being operable for setting a predetermined voltage differential between said positive and negative input terminals to prevent erroneous production of said firing device control signals.

6. The controller of claim 5, wherein each of said phase detectors further includes:

a second operational amplifier having a negative input terminal and a grounded positive input terminal, said second operational amplifier for outputting a first square-wave output signal;

a third operational amplifier having a positive input terminal and a grounded negative input terminal, said third operational amplifier for outputting a second square-wave output signal; and a third adjustable voltage dividing network connected to the power line input terminal, for outputting an adjustable voltage to the negative input terminal of said second operational amplifier and to the positive input terminal of said third operational amplifier.

7. The controller of claim 6, wherein each phase comparator further includes:

a ramp generator connected between the outputs of said second and third operational amplifiers.

* * * * *